United States Patent
Negroni et al.

(10) Patent No.: US 8,151,848 B2
(45) Date of Patent: Apr. 10, 2012

(54) TIRE HAVING A COLORED SURFACE

(75) Inventors: Fabio Negroni, Milan (IT); Mauro Paolo Soatto, Milan (IT); Paolo Massimino, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 626 days.

(21) Appl. No.: 12/086,760

(22) PCT Filed: Dec. 21, 2005

(86) PCT No.: PCT/EP2005/013828
§ 371 (c)(1),
(2), (4) Date: May 22, 2009

(87) PCT Pub. No.: WO2007/071272
PCT Pub. Date: Jun. 28, 2007

(65) Prior Publication Data
US 2010/0024942 A1    Feb. 4, 2010

(51) Int. Cl.
*B60C 1/00* (2006.01)

(52) U.S. Cl. ........ 152/525; 152/450; 152/523; 152/539; 152/543; 524/507; 524/589; 524/590; 524/457

(58) Field of Classification Search ................ 152/154.2, 152/209.1, 450, 523, 524, 525, 539, 543; 524/507, 589, 590, 457
See application file for complete search history.

(56) References Cited

U.S. PATENT DOCUMENTS

| | | | |
|---|---|---|---|
| 3,648,748 A | 3/1972 | Lovell | |
| 4,259,227 A | 3/1981 | Ojakaar | |
| 4,530,976 A * | 7/1985 | Kordomenos et al. | ... 525/440.02 |
| 4,768,937 A | 9/1988 | Singh | |
| 4,872,822 A | 10/1989 | Pizzorno | |
| 5,149,591 A * | 9/1992 | Patitsas et al. | ............. 428/423.1 |
| 2004/0050471 A1 | 3/2004 | Cottin et al. | |
| 2004/0055680 A1 | 3/2004 | Cottin et al. | |

FOREIGN PATENT DOCUMENTS

| | | |
|---|---|---|
| DE | 2 257 501 | 5/1974 |
| EP | 0 199 064 B1 | 10/1986 |
| WO | WO 98/14338 A1 | 4/1998 |
| WO | WO 02/053662 A1 | 7/2002 |

OTHER PUBLICATIONS

"Standard Practice for Xenon-Arc Exposures of Paint and Related Coatings", ASTM Standard D6695-03b, pp. 1-7, (2007).

* cited by examiner

*Primary Examiner* — Joseph Del Sole
*Assistant Examiner* — David N Brown, II
(74) *Attorney, Agent, or Firm* — Finnegan, Henderson, Farabow, Garrett & Dunner, L.L.P.

(57) ABSTRACT

A tire includes at least one outer structural element, wherein the at least one outer structural element is at least partially coated by at least one colored coating layer including a colored composition including (a) 5% by weight to 50% by weight with respect to the total weight of the dry colored composition, of at least one crosslinked polymeric compound obtained by reacting ($a_1$) at least one thermoplastic polyurethane with ($a_2$) at least one polyisocyanate; (b) 10% by weight to 80% by weight with respect to the total weight of the dry colored composition, of at least one thermoplastic polymeric compound having a glass transition temperature higher than or equal to 20° C., and (c) 3% by weight to 50% by weight, with respect to the total weight of the dry colored composition, of at least one coloring agent. Preferably, the at least one structural element is at least one of the tire sidewalls.

36 Claims, 1 Drawing Sheet

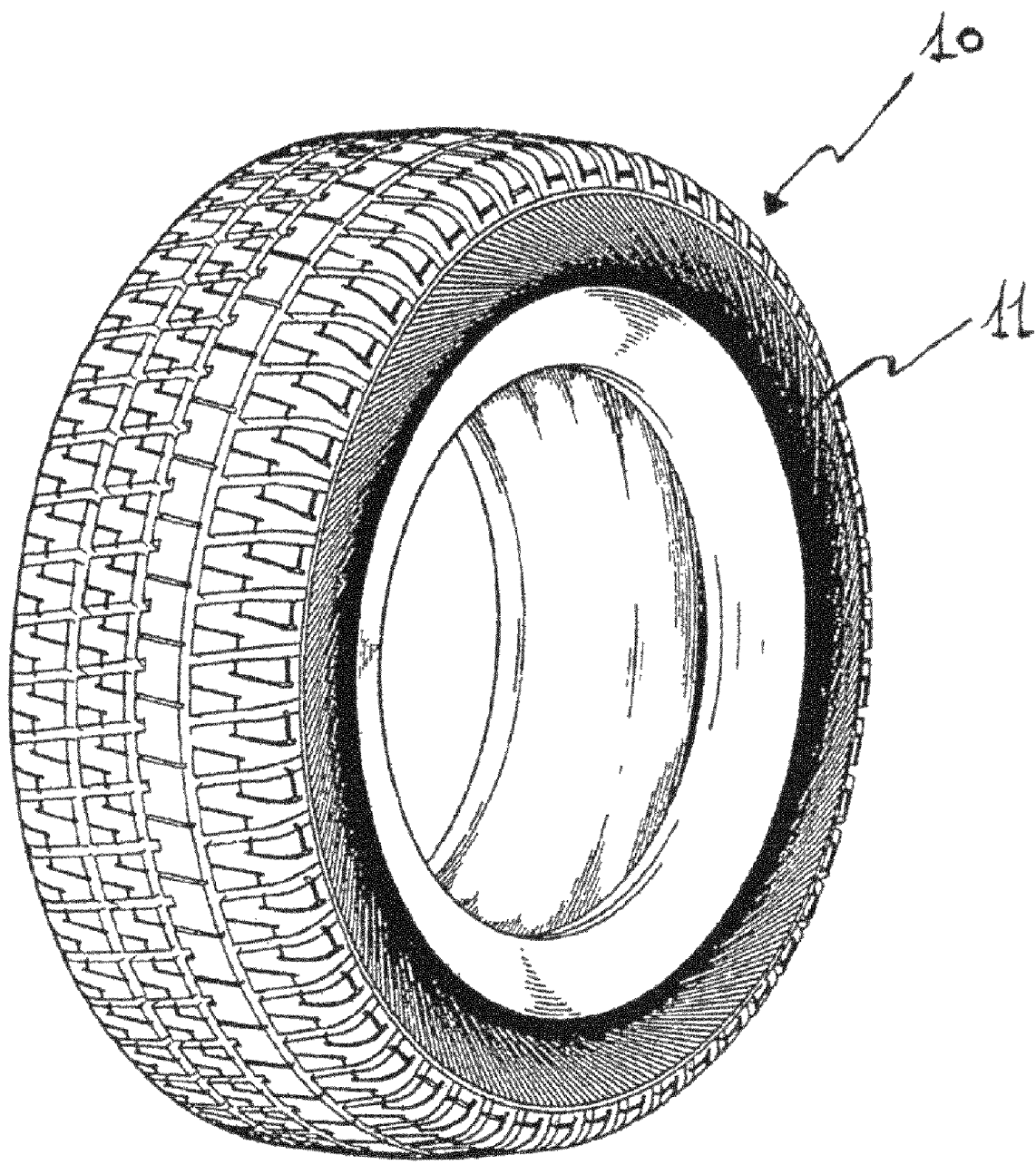

TIRE HAVING A COLORED SURFACE

CROSS REFERENCE TO RELATED APPLICATION

This application is a national phase application based on PCT/EP2005/013828, filed Dec. 21, 2005, the content of which is incorporated herein by reference.

BACKGROUND OF THE INVENTION

1. Field of the Invention

The present invention relates to a tire having a colored surface, in particular a colored outer surface.

More in particular, the present invention relates to a tire comprising at least one outer structural element, said at least one outer structural element being at least partially coated by at least one colored coating layer.

2. Description of the Related Art

Colored compositions intended to cover the outer surface of tires are already known in the art.

For example, U.S. Pat. No. 3,648,748 relates to a tire comprising a cured rubber tire having adhered thereto a laminate of a cured polyurethane comprising a cured reaction mixture prepared by reacting an organic polyisocyanate with a reactive hydrogen containing polymeric material having a molecular weight of from about 700 to about 5000 and a hydroxyl functionality greater than 2.0 up to about 3.0 selected from hydroxyl terminated polymers of the group consisting of polymer and copolymers of 1,3-diene hydrocarbons having 4 to 6 carbon atoms, copolymers of 1,3-diene hydrocarbons having 4 to 6 carbon atoms with styrene, acrylonitrile, ethyl acrylate and chloro substituted 1,3-diene hydrocarbons having 4 to 6 carbon atoms. The tire is prepared by the method which comprises (A) cleaning a portion of the surface of a cured rubber tire to be coated with a solvent, (B) coating the said surface with the liquid polyurethane reaction mixture and (C) curing the said reaction mixture to form a composite structure. The abovementioned laminate is said to be formed on the cured rubber tire without previously chemically treating the rubber and to provide a decorative, protective or identification surface for the tire.

International Patent Application WO 98/14338 relates to a method of imprinting markings on rubber articles, more particularly tires, the marking being applied by means of ink and the rubber article comprising no wax or stabilizer additives in the marking portion, characterized by the marking being imprinted (for example, by a tampon printing method) and by the ink comprising a binding agent which is adapted to the rubber blend of the marking portion. Preferably, said ink is a solvent-based two component ink comprising from 20% to 35% of coloring pigments and/or 2% to 5% vehicle and/or 40% to 60% solvent and/or 15% to 20% binding agent said binding agent comprising polyurethane resin and polyurethane prepolymer. Preferably, the ink is cured with aliphatic or aromatic isocyanates. The abovementioned method is said to give good durability of the marking on the rubber article. In addition, by eliminating wax or stabilizer additives, there is no risk of the tire or marking in the marking portion becoming discolored.

United States Patent Application 2004/0050471 relates to a tire having an outer rubber surface based at least in part on essentially unsaturated diene elastomers, said outer rubber surface covered with a colored coating bonded thereto, said colored coating having at least one layer in contact with air and including a composition comprising:
(1) a polyurethane in majority proportion; and
(2) flakes of aluminum in an amount of between 20 and 150 parts of flakes per hundred parts of dry polyurethane (phr);
wherein the polyurethane is produced from a polyol selected from the group consisting of aliphatic polyethers, aliphatic polyesters, polyethers having a main chain that is semi-aromatic and polyesters having a main chain that is semi-aromatic; and the bond between the elastomer and colored coating results from interaction of the polyurethane and polar functions on the elastomer. In fact, said composition is laid on the vulcanized tire after treatment of the tire surface to provide reactive polar functions. The abovementioned colored coating is said to inhibit the degradation due to oxidation and ozone and greatly limits the migration of the antioxidants towards the surface of the tire, allowing the rubber composition to retain its color. Furthermore, the coating prevents the migration of the waxes towards the surface by a barrier effect, thereby avoiding efflorescence and retaining its surface appearance.

United States Patent Application 2004/0055680 relates to a tire having an outer rubber surface based at least in part on essentially unsaturated diene elastomers, said outer rubber surface covered with a colored coating bonded thereto, said colored coating having at least one layer in contact with air and including a composition comprising:
(1) a polyurethane in majority proportion; and
(2) flakes of mica in an amount of between 10 and 80 parts of flakes per hundred parts of dry polyurethane (phr);
wherein the polyurethane is produced from a polyol selected from the group consisting of aliphatic polyethers, aliphatic polyesters, polyethers having a main chain that is semi-aromatic and polyesters having a main chain that is semi-aromatic; and the bond between the elastomer and colored coating results from interaction of the polyurethane and polar functions on the elastomer. In fact, said composition is laid on the vulcanized tire after treatment of the tire surface to provide reactive polar functions. The abovementioned colored coating is said to inhibit the degradation due to oxidation and ozone and greatly limits the migration of the antioxidants towards the surface of the tire, allowing the rubber composition to retain its color. Furthermore, the coating prevents the migration of the waxes towards the surface by a barrier effect, thereby avoiding efflorescence and retaining its surface appearance.

SUMMARY OF THE INVENTION

According to the Applicant, the colored compositions described above may have some disadvantages.

For example, the Applicant has noticed that the application of liquid polyurethane reaction mixtures (i.e., a liquid reaction mixture comprising an organic polyisocyanate and a polymeric material containing reactive hydrogen atoms) to the surface of the vulcanized tire which has to be coated, may cause the release of carbon dioxide which may lead to the formation of defects on the coated surface with a consequent poor appearance of the same. On the other end, the Applicant has noticed that the use of colored compositions comprising polyurethanes may show discoloration problems due to the surface migration of antioxidants, antiozonants and waxes usually present in the elastomeric compositions, in particular in those used in tire manufacturing. Moreover, difficulties have been encountered in obtaining a good adhesion between colored compositions comprising polyurethanes and the surface of the vulcanized tire to be coated.

The Applicant has faced the problem of providing a colored composition which may be applied onto the surface of a vulcanized tire which overcome all the disadvantages above disclosed.

The Applicant has now found that it is possible to overcome the above disclosed disadvantages by using a colored composition comprising at least one crosslinked polymeric compound obtained from the reaction of at least one thermoplastic polyurethane with at least one polyisocyanate, at least one thermoplastic polymeric compounds having a glass transition temperature higher than or equal to 20° C., and at least one coloring agent. Said colored composition allows to form a colored coating layer which is flexible and strongly adheres to the surface of the vulcanized tire without previously chemically treating said surface. Moreover, the rubbery behaviour of said colored coating layer makes it possible to withstand all the deformations experienced after the manufacture of the tire and, in particular, upon the inflation thereof and in its later use. Moreover, said colored coating layer does not show discoloration problems. Furthermore, said colored coating layer shows a good appearance (i.e., the formation of defects during the application of said colored composition onto the surface of the vulcanized tire is avoided).

According to a first aspect, the present invention relates to a tire comprising at least one outer structural element, wherein said at least one outer structural element is at least partially coated by at least one colored coating layer including a colored composition comprising:
(a) from 5% by weight to 50% by weight, preferably from 15% by weight to 30%, by weight, with respect to the total weight of the dry colored composition, of at least one crosslinked polymeric compound obtained by reacting ($a_1$) at least one thermoplastic polyurethane with ($a_2$) at least one polyisocyanate;
(b) from 10% by weight to 80% by weight, preferably from 30% by weight to 70% by weight, with respect to the total weight of the dry colored composition, of at least one thermoplastic polymeric compound having a glass transition temperature higher than or equal to 20° C., preferably of from 30° C. to 150° C., more preferably of from 45° C. to 100° C.;
(c) from 3% by weight to 50% by weight, preferably from 4% by weight to 30% by weight, with respect to the total weight of the dry colored composition, of at least one coloring agent.

According to one preferred embodiment, the tire comprises:
a carcass structure of a substantially toroidal shape, having opposite lateral edges associated with respective right-hand and left-hand bead structures, said bead structures comprising at least one bead core and at least one bead filler;
a belt structure applied in a radially external position with respect to said carcass structure;
a tread band radially superimposed on said belt structure;
a pair of sidewalls applied laterally on opposite sides with respect to said carcass structure;
wherein said at least one outer structural element is at least one of said sidewalls;

According to a further aspect, the present invention relates to a colored composition comprising:
(a) from 5% by weight to 50% by weight, preferably from 15% by weight to 30% by weight, with respect to the total weight of the dry colored composition, of at least one crosslinked polymeric compound obtained by reacting ($a_1$) at least one thermoplastic polyurethane with ($a_2$) at least one polyisocyanate;
(b) from 10% by weight to 80% by weight, preferably from 30% by weight to 70% by weight, with respect to the total weight of the dry colored composition, of at least one thermoplastic polymeric compound having a glass transition temperature higher than or equal to 20° C., preferably of from 30° C. to 150° C., more preferably of from 45° C. to 100° C.;
(c) from 3% by weight to 50% by weight, preferably from 4% by weight to 30% by weight, with respect to the total weight of the dry colored composition, of at least one coloring agent.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

According to one preferred embodiment, said thermoplastic polyurethane ($a_1$) has a glass transition temperature ($T_g$) lower than or equal to −10° C., preferably of from −15° C. to −60° C.

According to a further preferred embodiment, said thermoplastic polyurethane ($a_1$) has a softening point of from 25° C. to 150° C., preferably of from 30° C. to 100° C.

According to a further preferred embodiment, said thermoplastic polyurethane ($a_1$) has a cold crystallization temperature of from −20° C. to +10° C., preferably of from −10° C. to +0° C.

Said glass transition temperature ($T_g$), said softening point and said cold crystallization temperature, were measured by DSC (Differential Scanning Calorimetry) analysis: further details about said analysis will be given in the examples which follow.

According to one preferred embodiment, said thermoplastic polyurethane ($a_1$) has a Standard Viscosity, measured at 20° C., of from 500 mPa·s to 2000 mPa·s, preferably of from 1000 mPa·s to 1500 mPa·s.

Said Standard Viscosity was measured as a 15% solution of said thermoplastic polyurethane ($a_1$) in methyl ethyl ketone (MEK).

According to one preferred embodiment, said thermoplastic polyurethane ($a_1$) may be selected from crosslinkable polyurethanes obtained by reacting one or more polyols with one or more organic polyisocyanates. As used herein, the term "crosslinkable" means that the polymer has functional groups capable of reacting with a crosslinking agent.

Preferably, said thermoplastic polyurethane ($a_1$) has pendant hydroxyl groups free for reaction with a crosslinking agent, although other functional groups are possible for crosslinking such as, for example, isocyanate groups, or carboxyl groups. Said functional groups are unprotected (i.e., unblocked), so as to allow crosslinking.

A variety of polyols may be utilized in preparing the thermoplastic polyurethane ($a_1$). Also mixture of polyols may be used. The term "polyols" as used herein refers to polyhydric alcohols containing two or more hydroxyl groups. The polyol preferably has a hydroxyl functionality of 2-4 (i.e. diols, triols, tetraols). More preferably, the polyol is a diol, although higher functional polyols such as, for example, triols or tetrols, may be used in combination with a diol. Most preferably, the polyol is a diol or a mixture of diols.

The polyol can be a polyether polyol such as, for example, polytetramethylene glycol, or polypropylene glycol; a polyester polyol such as, for example, the reaction product of adipic acid and neopentyl glycol, or of phthalic anhydride and hexanediol; an acrylic polyol; or mixtures thereof.

According to one preferred embodiment, the polyol is a hydroxyl terminated polyester polyol prepared by polycondensation of an aliphatic or aromatic dicarboxylic acid and a molar excess of an aliphatic glycol.

According to a further preferred embodiment, the polyol is a hydroxyl terminated polyester diol of the following formula:

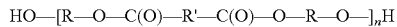

HO—[R—O—C(O)—R'—C(O)—O—R—O—]$_n$H wherein R is an aliphatic group having from 2 to 10 carbon atoms, R' is an aliphatic or aromatic group having up to 14 carbon atoms, and n is at least 2. This polyester diol is typically formed from one or more types of aliphatic or aromatic acids/esters and one or more types of aliphatic diols. For example, a polyester diol of the above formula may be prepared from an aromatic acid or ester such as, for example, isophthalic acid, dimethyl isophthalate, or mixture thereof, and a diol such as, for example, neopentyl glycol, 1,6-hexanediol, 1,4-cyclohexane dimethanol, or mixture thereof. If both an aromatic and an aliphatic material are used, the weight percent of the aromatic material is generally less than that of the aliphatic material.

The polyester diol, or other suitable polyol, preferably has a hydroxyl equivalent weight of from 90 to 5000, more preferably of from 200 to 3000, and most preferably of from 250 to 2000. The polyester diol, or other suitable polyol, preferably has an acid number of no greater than 1.0, and more preferably of no greater than 0.7. Acid number may be determined in accordance with ASTM Standard D4662-93.

Example of a polyester diol which may be used according to the present invention and is available commercially is the product known under the tradename of Fomrez® 8056-146 from Witco Corp. This resin is believed to contain neopentyl glycol at approximately 26 wt %, 1,6-hexanediol at approximately 29 wt %, adipic acid/ester at approximately 33 wt %, and isophthalic acid/ester at approximately 12 wt %. Other polyester diols are commercially available under the tradenames of Fomrez® 55-112 (believed to contain approximately 47 wt % neopentyl glycol and approximately 53% adipic acid/ester) and Fomrez® 8066-120 (believed to contain approximately 49 wt % hexanediol, approximately 33 wt % adipic acid/ester, and approximately 18 wt % isophthalic acid/ester) from Witco Corp, as well as Lexorez® from Inolex Chemical Company, or Rucoflex® from Ruco Polymer Corp. It should be understood that mixtures of such diols may be used in the preparation of the thermoplastic polyurethane (a$_1$) used according to the present invention.

Alternatively, a variety of triols may be utilized in the preparation of said thermoplastic polyurethane (a$_1$).

According to one preferred embodiment, said triols may be selected from polyether triols such as, for example, polypropylene oxide triol, polyester triols other than polycaprolactone triols, and simple triols such as, for example, trimethylolpropane, glycerol, or mixtures thereof. Preferably the hydroxyl groups in the triol are primary in order to facilitate crosslinking of the resultant polymer.

Examples of triols which may be used according to the present invention and are commercially available are the products known under the tradename of Fomrez® 1066 (trimethylolpropane, hexanediol, and adipate) from Witco Corp., Tone® 0305 (a polycaprolactone triol) from Union Carbide Corp., Rucoflex® F-2311 from Ruco Polymer Corp. It should be understood that these materials could be used as mixtures with other polyols to achieve a glass transition temperature (T$_g$) of less than 0° C.

Other polyester polyols are available from Bayer under the tradename of Desmophen®. For example, Desmophen® 670 BA is available as a solution in n-butyl acetate (80% solids). It is believed to be derived from a mixture comprising isophthalic acid, 1,6-hexanediol, trimethylol propane, phtalic acid and/or phthalic anhydride, and is characterized as having an equivalent weight of 500, an acid number of 2.0 maximum, and a hydroxyl number of from 104 to 112.

Tetrafunctional or higher alcohols such as pentaerythritol may also be useful polyols. If a triol and higher functional polyol is used, the NCO:OH stoichiometry will need to be adjusted accordingly, although this would be understood by anyone skilled in the art.

A wide variety of polyisocyanates may be utilized in preparing said polyurethane (a$_1$). As used herein, the term "polyisocyanates" means any organic compound that has two or more reactive isocyanate (—NCO) groups in a single molecule that may be aliphatic, alicyclic, aromatic, or mixtures thereof. This definition includes diisocyanates, triisocyanates, tetraisocyanates, or mixtures thereof. Preferably, diisocyanates are utilized. These isocyanate groups may be bonded to aromatic or cycloaliphatic groups. Most preferably aliphatic isocyanates, including cycloaliphatic isocyanates, are used to improve weathering and eliminate yellowing. Useful diisocyanates include, but are not limited to, those selected from the group consisting of bis(4-isocyanotecyclohexyl)methane (H$_{12}$ MDI, available from Bayer Corp.), diphenylmethane diisocyanate (MDI, available from Bayer Corp.), isophorone diisocyanate (IPDI, available from Huels America), toluene 2,4-diisocyanate (TDI, available from Aldrich Chemical Co.), hexamethylene diisocyanate (HDI, available from Aldrich Chemical Co.), m-tetramethylxylene diisocyanate (TMXDI, available from Aldrich Chemical Co.), 1,3-phenylene diisocyanate. It is also noted that mixtures of the above disclosed diisocyanates may also be used.

The stoichiometry of the polyurethane reaction is based on a ratio of isocyanate equivalents to polyol equivalents (NCO:OH ratio). The overall preferred NCO:OH ratio for the polyurethane is less than 1:1 to allow for residual hydroxyl groups in the resultant polyurethane. More preferably, the NCO:OH ratio is from 0.8:1 to 1:1, still more preferably, the NCO:OH ratio is of from 0.9:1 to 1:1. It will be understood by anyone skilled in the art that this ratio will vary depending upon the synthetic sequence when using triol(s) and/or tetrol(s). This is accomplished typically by varying the amount of isocyanate such that gellation is avoided and a soluble product is obtained.

A catalyst may be added to the reaction mixture of polyol(s) and polyisocyanate(s) to promote the reaction. Catalysts for reacting polyisocyanate and active hydrogen containing compounds are well known in the art. Examples of said catalysts may be found, for instance, in U.S. Pat. No. 4,495,061. Preferred catalysts include organometallic compounds and amines. The organometallic compounds may be organotin compounds such as dimethyltin dilaurate, dibutyltin dilaurate, and dibutyltin dimercaptide. The preferred catalyst is dibutyltin dilaurate. The catalyst is used in an amount effective to promote the reaction. Preferably, it is used in an amount of from 0.01% by weight to 2% by weight, preferably of from 0.01% by weight to 0.03% by weight, with respect to the total weight of solids.

Said thermoplastic polyurethane (a$_1$) may be prepared in the presence or absence of a solvent. Preferably, it is prepared in the presence of one or more organic solvents. Examples of suitable solvents include, but are not limited to, methyl ethyl ketone, amyl acetate, benzene, toluene, butanone, butoxy ethoxyethyl acetate, 2-ethoxyethyl acetate, cyclohexanone, dioxane, 4-methyl-2-pentanone, tetrahydrofuran, benzene, toluene, xylene, or mixtures thereof. Methyl ethyl ketone is particularly preferred. The polyurethane reaction mixture preferably includes from 30% by weight to 75% by weight, more preferably from 40% by weight to 55% by weight, of total solids.

According to one preferred embodiment, said thermoplastic polyurethane ($a_1$) is selected from hydroxyl terminated polyester polyurethanes.

Examples of thermoplastic polyurethanes ($a_1$) which may be used according to the present invention and are commercially available are the products Irostic® from Huntsman Polyurethanes.

As reported above, in order to obtain the crosslinked polymeric compound (a) above disclosed, at least one polyisocyanate ($a_2$) may be used.

According to one preferred embodiment, said polyisocyanate ($a_2$) may be selected from the polyisocyanates above disclosed. Aromatic polyisocyanates are particularly preferred.

Examples of polyisocyanates ($a_2$) which may be used according to the present invention and are commercially available are the products Irodur® E 462 from Huntsman Polyurethanes, or Desmodur® MT from Bayer.

In the crosslinking reaction the molar ratio of the hydroxyl group of the thermoplastic polyurethane ($a_1$) and the isocyanate groups of the polyisocyanate ($a_2$) may be different.

For example, when a hydroxyl terminated polyester polyurethane is used as the thermoplastic polyurethane ($a_1$) and a polyisocyanate ($a_2$) is used as the crosslinking agent, the molar ratio of the hydroxyl group of the hydroxyl terminated polyester polyurethane to the isocyanate group of the polyisocyanate is preferably of from 1:10 to 10:1, more preferably of from 1.1:1 to 2:1.

A catalyst may also be added to promote the crosslinking reaction. Suitable catalysts may be selected from those above disclosed.

The crosslinking reaction may be carried out at a temperature of from 20° C. to 120° C., for a time of from 10 minutes to 72 hours.

For example, the crosslinking may be carried out by heating the thermoplastic polyurethane ($a_1$) and the polyisocyanate ($a_2$) at a temperature of from 50° C. to 120° C., preferably of from 40° C. to 80° C., for a time of from 10 minutes to 6 hours, preferably of from 30 minutes to 2 hours.

Alternatively, the crosslinking reaction may be carried out at room temperature (23° C.), for a time of from 24 hours to 72 hours, preferably of from 26 hours to 48 hours.

Preferably, in order to avoid an excessive increase of the viscosity of the colored composition before the application of the same onto the surface to be coated, the mixing of the thermoplastic polyurethane ($a_1$) and the polyisocyanate ($a_2$) is carried out not more than 48 hours, preferably from 5 minutes to 24 hours, before the step of applying said colored composition onto the surface to be coated.

The above crosslinking reaction may be carried out either before the addition of components (b) and (c) to the colored composition, or after the addition of components (b) and (c) to the colored composition. Preferably, the above crosslinking reaction is carried out after the addition of components (b) and (c) to the colored composition.

Preferably, the above crosslinking reaction is carried out after the step of applying said colored composition onto the surface to be coated.

According to one preferred embodiment, said thermoplastic polymeric compound (b) contains hydroxyl groups in its molecule, said hydroxyl groups being present in an amount higher than or equal to 1% by weight, preferably of from 1.5% by weight to 20% by weight, with respect to the total weight of the thermoplastic polymeric compound (b).

Said hydroxyl groups may be present both in the main chain of the thermoplastic polymeric compound and/or in its side chain.

According to a further preferred embodiment, said thermoplastic polymeric compound (b) is selected from:
($b_1$) vinyl chloride copolymers;
($b_2$) hydrogenated polyketones;
or mixtures thereof.

According to one preferred embodiment, said vinyl chloride copolymers ($b_1$) may be selected from copolymers of vinyl chloride with at least one other vinyl comonomer.

The term copolymer as used herein includes copolymers of vinyl chloride with two or more comonomers, and thus includes terpolymers.

Preferably, the vinyl chloride copolymers ($b_1$) may be prepared by copolymerizing vinyl chloride with at least one vinyl comonomer which may be selected from: vinyl acetate, vinyl alcohol, 2-propenyl acetate, acrylic acid, acrylic acid esters (such as, for example, methyl methacrylate, 2-hydroxypropyl acrylate, glycidyl methacrylate), isobutyl vinyl ether, maleic acid, vinyl stearate, acrylamide, vinyl sulfonic acid, vinylidene chloride, or mixtures thereof.

Vinyl chloride/acrylic acid ester copolymers, vinyl chloride/vinyl acetate copolymers, or mixtures thereof, are particularly preferred.

Said vinyl chloride copolymers ($b_1$) may further contain carboxylic and/or epoxy functional groups in their molecule.

Alternatively, said vinyl chloride copolymers ($b_1$) comprise terpolymers of vinyl chloride, another vinyl compound such as vinyl acetate, and an unsaturated carboxylic or polycarboxylic acid or ester. Some examples of useful terpolymers include vinyl chloride/vinyl acetate/maleic acid terpolymers, vinyl chloride/vinyl acetate/acrylic acid terpolymers, vinyl chloride/vinyl acetate/crotonic acid terpolymers, or mixture thereof.

Said vinyl chloride copolymers ($b_1$) may be obtained commercially or may be synthesized by a free radical initiated polymerization of vinyl chloride, at least one other vinyl comonomer and, optionally, at least one unsaturated carboxylic or polycarboxylic acid or ester.

Examples of vinyl chloride copolymers ($b_1$) which may be used according to the present invention and are commercially available are the products Vinnol® from Waker.

According to one preferred embodiment said hydrogenated polyketones ($b_2$) may be selected from compounds having the following general formula (I):

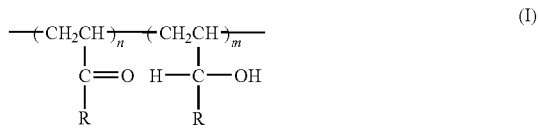

wherein:
R groups, which may be equal or different from each other, represent a linear or branched $C_1$-$C_{20}$ alkyl group; a $C_6$-$C_{18}$ aryl group;
the n:m ratio is of from 0.1:1 to 1:1, preferably of from 0.3:1 to 0.5:1.

Example of compounds having general formula (I) which may be used according to the present invention are: hydrogenated poly(vinyl methyl ketone), hydrogenated poly(vinyl butyl ketone), hydrogenated poly(vinyl phenyl ketone), hydrogenated poly(vinyl naphthyl ketone), or mixtures thereof. Hydrogenated poly(vinyl phenyl ketone) is particularly preferred.

According to one preferred embodiment, said coloring agent (c) may be selected from: iron oxide, titanium dioxide, mica, calcium sodium borosilicate, powdered metals such as powdered aluminum or copper, metal pastes such as aluminum pastes, organic constituent containing pigments, inorganic constituent containing pigments, fluorescent constituent containing pigments, phosphorescent constituent containing pigments, luminescent constituent containing pigments, ultraviolet absorbing pigments, mineral constituent containing pigments, amorphous glass oxides, polyacrylates, metal flakes, reflective pigments, or mixtures thereof.

The selection of the coloring agent (c) varied based upon the color choice and intensity of color one wishes to impart onto the surface to be coated.

Examples of coloring agent (c) which may be used according to the present invention and are commercially available are the products Offset® FM/4500 (aluminum paste) from Schlenk, or Hostaperm Blue® BT-617-D (blue pigment) from Clariant.

Reinforcing fillers such as, for example, carbon black or silica, may be added to the colored composition above disclosed to impart other properties to said colored composition, as long as the color of the filler does not modify or adversely change the desired coloration of the colored composition. The presence of carbon black in very small proportion, i.e. a few phr [phr=parts per hundred part of thermoplastic polyurethane ($a_1$)], allows one to obtain a colour with a darker appearance, especially with red, blue, or green pigments.

The above disclosed colored composition may be applied onto the surface of the outer structural element of a vulcanized tire. Preferably, as reported above, the crosslinking reaction between the thermoplastic polyurethane ($a_1$) and the polyisocyanate ($a_2$) is carried out after the application of said colored composition onto the surface of the outer structural element of a vulcanized tire.

The method of applying said colored composition onto the surface of the outer structural element of a vulcanized tire comprises the following steps:
(i) cleaning a portion of the surface to be coated with a solvent;
(ii) coating said surface with the colored composition above disclosed;
(iii) drying said colored composition to obtain a colored coating layer.

Preferably, the solvent used in step (i) may be selected from: ketones such as, for example, acetone, methyl ethyl ketone, methyl isobutyl ketone; alcohols such as, for example, methanol, ethanol, isopropanol, butanol; aliphatic or aromatic hydrocarbons such as, for example, pentane, hexane, benzene, toluene; or mixture thereof.

The above disclosed step (ii) may be carried out with techniques known in the art such as, for example, by painting, brushing, spraying, rolling, dipping, scraping, pad printing.

The above disclosed step (iii) may be carried out in different ways.

For example, the above reported step (iii) may be carried out at ambient temperature (23° C.), for a time of from 24 hours to 72 hours, preferably of from 26 hour to 48 hours.

Alternatively, the above reported step (iii) may be carried out by heating the vulcanized tire at a temperature of from 50° C. to 120° C., preferably of from 40° C. to 80° C., for a time of from 10 minutes to 6 hours, preferably of from 30 minutes to 2 hours.

During said step (iii), the crosslinking of the polymeric compound (a) is obtained.

Depending on the means used to deposit the colored composition, the thickness of the colored coating layer formed after drying said colored composition may be varied. Good results are obtained with a dry colored coating layer having a thickness higher than or equal to 20 µm.

However, the desired thickness may vary according to the surface where the colored composition is applied.

For example, a thickness of from 20 µm to 100 µm, may be sufficient on the tire sidewalls as, a higher thickness such as, for example, of from 100 µm to 500 µm, may be required for the bottoms of the grooves of the tread patterns of the tire, or in the zones where a protective effect of the colored coating layer is required with respect to the atmosphere.

The tire may or may not be mounted and inflated prior to said application.

The outer structural element of the tire which has to be coated is usually obtained by crosslinking a crosslinkable elastomeric composition comprising at least one elastomeric polymer. Preferably, said elastomeric polymer may be selected from: cis-1,4-polyisoprene (natural or synthetic, preferably natural rubber), 3,4-polyisoprene, polybutadiene (in particular polybutadiene with a high 1,4-cis content), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

Said crosslinkable elastomeric composition may further comprise at least one reinforcing filler such as, for example, carbon black, silica, alumina, aluminosilicates, calcium carbonate, kaolin, or mixtures thereof.

The crosslinkable elastomeric composition above disclosed may be vulcanized according to known techniques, in particular with sulfur-based vulcanizing systems commonly used for elastomeric polymers. To this end, in the crosslinkable composition, after one or more steps of thermomechanical processing, a sulfur-based vulcanizing agent is incorporated together with vulcanization accelerators. In the final processing step, the temperature is generally kept below 140° C., so as to avoid any unwanted pre-crosslinking phenomena.

The vulcanizing agent most advantageously used is sulfur, or molecules containing sulfur (sulfur donors), with accelerators and activators known to those skilled in the art.

Activators that are particularly effective are zinc compounds, and in particular ZnO, $ZnCO_3$, zinc salts of saturated or unsaturated fatty acids containing from 8 to 18 carbon atoms, such as, for example, zinc stearate, which are preferably formed in situ in the elastomeric composition from ZnO and fatty acid, and also BiO, PbO, $Pb_3O_4$, $PbO_2$, or mixtures thereof.

Accelerators that are commonly used may be selected from: dithiocarbamates, guanidine, thiourea, thiazoles, sulphenamides, thiurams, amines, xanthates, or mixtures thereof.

Said crosslinkable elastomeric composition may comprise other commonly used additives selected on the basis of the specific application for which the composition is intended. For example, the following may be added to said crosslinkable elastomeric composition: antioxidants, anti-ageing agents, plasticizers, adhesives, anti-ozone agents, modifying resins, fibres (for example Kevlar® pulp), or mixtures thereof.

BRIEF DESCRIPTION OF THE DRAWING

The present invention will now be illustrated in further detail by means of the attached FIG. 1 which is a side view of a tire made according to the present invention.

FIG. 1 shows a tire (10) having a sidewall (11) to which a colored composition according to the present invention is applied. In FIG. 1, the obtained colored coating layer is circumferentially extended to cover the whole sidewall (11). Alternatively, the colored coating layer may cover only a portion of the tire sidewall, such as for example, in the case said colored coating layer covers designs, letters, logos, trademarks, decals which may be placed upon the sidewall of the tire.

DETAILED DESCRIPTION OF THE INVENTION

The process for producing the tire according to the present invention may be carried out according to techniques and using apparatus that are known in the art, as described, for example, in European Patents EP 199,064, or in U.S. Pat. No. 4,872,822 or U.S. Pat. No. 4,768,937, said process including manufacturing the crude tire, moulding and vulcanizing the crude tire.

The present invention will be further illustrated below by means of a number of preparation examples, which are given for purely indicative purposes and without any limitation of this invention.

The components used for the preparation of the colored composition were the following:

Irostic® S 6148-12 (Huntsman Polyurethanes): hydroxyl terminated polyester polyurethane having a glass transition temperature of −47° C. (midpoint); a softening point of 38° C. (peak); a cold crystallization temperature of −8° C. (peak); a Standard viscosity, measured at 20° C., as a 15% solution of said polyurethane in methyl ethyl ketone (MEK), of 1000 mPa·s;

Irodur® E 462 (Huntsman Polyurethanes): 27% ethyl acetate solution of aromatic polyisocyanate;

Vinnol® E 15/48 A: vinyl chloride/acrylic acid ester copolymer having a glass transition temperature of +69° C.; a hydroxyl groups contents of 1.8% by weight with respect to the total weight of the copolymer;

PVPK (Sigma Aldrich): hydrogenated poly(vinyl phenyl ketone) having a glass transition temperature of 50° C.; a hydroxyl groups contents of 12.7% by weight with respect to the total weight of the polymer.

Offset® FM/4500 (Schlenk); aluminium paste.

The glass transition temperature, the softening point, and the cold crystallization temperature of the Irostic® S 6148-12, were determined by DSC (Differential Scanning Calorimetry) using a Mettler Toledo DSC 820 differential scanning calorimeter. The temperature program below was applied to the sample to be analysed:

isothermal for 5 minutes at +50° C.;
cooling from +50° C. to −130° C. at a rate of 10° C./min.;
isothermal for 10 minutes at −130° C.;
heating from −130° C. to 150° C. at a rate of 10° C./min.

Example 1

Preparation of the Colored Composition 45 g of a 10% by weight solution of Irostic® S 6148-12 in methyl ethyl ketone, 45 g of a 25% by weight solution of Vinnol® E 15/48 A in methyl ethyl ketone, 10 g of Irodur® E 462, and 1.0 g of Offset® FM/4500, were added to a 250 ml flask and were maintained, under stirring, for 10 min, at a temperature of 30°. A colored composition was so obtained.

Example 2

Preparation of the Colored Composition 30 g of a 10% by weight solution of Irostic® S 6148-12 in methyl ethyl ketone, 35 g of a 20% by weight solution of hydrogented poly(vinyl phenyl ketone) in methyl ethyl ketone, 10 g of Irodur® E 462, and 1.0 g of Offset® FM/4500, were added to a 250 ml flask and were maintained, under stirring, for 10 min, at a temperature of 30° C. A colored composition was so obtained.

Example 3

Comparative

Preparation of the Colored Composition 100 g of a 10% by weight solution of Irostic® S 6148-12 in methyl ethyl ketone, 10 g of Irodur®E 462, and 1.0 g of Offset® FM/4500, were added to a 250 ml flask and were maintained, under stirring, for 10 min, at a temperature of 30° C. A colored composition was so obtained.

Example 4

Xenon-ARC Accelerated Test

An elastomeric composition as disclosed in Table 1 was prepared as follows [the amounts of the various components are given in phr (phr=part per hundred parts of rubber)].

All the components, except sulfur, retardant (PVI) and accelerator (CBS), were mixed together in an internal mixer (model Pomini PL 1.6) for about 5 min (1$^{st}$ Step). As soon as the temperature reached 145±5° C., the elastomeric composition was discharged. The sulfur, retardant (PVI) and accelerator (CBS), were then added and mixing was carried out in an open roll mixer (2$^{nd}$ Step).

TABLE 1

| EXAMPLE | 3 |
|---|---|
| 1$^{st}$ STEP | |
| NR | 50 |
| BR | 50 |
| N660 | 50 |
| Zinc oxide | 3 |
| Stearic acid | 2 |
| Microcrystalline wax | 2 |
| 6-PPD | 4 |
| 2$^{nd}$ STEP | |
| CBS | 0.80 |
| PVI | 0.20 |
| Sulfur | 1.80 |

(*) comparative.
NR: natural rubber;
BR: cis-1,4-polybutadiene (Europrene ® Neocis BR40 - Polimeri Europa);
N660: carbon black;
6-PPD: N-(1,3-dimethylbutyl)-N'-phenyl-p-phenylene-diamine;
CBS (accelerator): N-cyclohexyl-2-benzothiazyl sulphenamide (Vulkacit ® CZ - Bayer);
PVI (retardant): N-cyclohexylthiophthalimide (Santogard ® PVI - Monsanto).

Test pieces of the above disclosed crosslinked elastomeric compositions (vulcanized at 170° C. for 10 min) having the following dimensions 100 mm×40 mm'3 mm were obtained.

The obtained test pieces were washed with methyl ethyl ketone and subsequently coated with the colored composition of Example 1, 2 and 3, by means of a brush. The colored composition was let to dry, at room temperature (23° C.), for 20 minutes and, subsequently, in an oven, at 80° C., for 2 hours. After drying, a colored coating layer 50 μm thick was obtained.

The colored test pieces were subjected to Xenon-Arc Accelerated Test according to ASTM Standard D6695-03 using a Q-Sun Xe-1-S (Xenon Test Chamber with daylight filter). The following conditions were applied:
black panel temperature: 60° C. (light cycle);
irradiance level: 0.55 W/m² at 340 nm;
intermitted light/dark cycle was: 160 min light, 5 min dark, without water spraying.

After 16 hours at the conditions reported above, the test pieces were examined visually in order to determine the presence of staining. The obtained results are the following:
test pieces coated with a colored composition of Example 1: no detectable staining;
test pieces coated with a colored composition of Example 2: no detectable staining;
test pieces coated with a colored composition of Example 3 (comparative): remarkable staining.

Moreover, the above reported test pieces were manually scratched with a scraper in order to evaluate the adhesion of the colored coating layer to the rubber surface: all the three test pieces showed good adhesion.

The invention claimed is:

1. A tire comprising at least one outer structural element, wherein said at least one outer structural element is at least partially coated by at least one colored coating layer comprising a colored composition comprising:
   (a) 5% by weight to 50% by weight with respect to the total weight of the dry colored composition of at least one crosslinked polymeric compound obtained by reacting ($a_1$) at least one thermoplastic polyurethane with ($a_2$) at least one polyisocyanate;
   (b) 10% by weight to 80% by weight with respect to the total weight of the dry colored composition of at least one thermoplastic polymeric compound having a glass transition temperature higher than or equal to 20° C.; and
   (c) 3% by weight to 50% by weight with respect to the total weight of the dry colored composition of at least one coloring agent.

2. The tire according to claim 1, comprising:
a carcass structure of a substantially toroidal shape, having opposite lateral edges associated with respective right-hand and left-hand bead structures, said bead structures comprising at least one bead core and at least one bead filler;
a belt structure applied in a radially external position with respect to said carcass structure;
a tread band radially superimposed on said belt structure; and
a pair of sidewalls applied laterally on opposite sides with respect to said carcass structure, wherein said at least one outer structural element is at least one of said sidewalls.

3. The tire according to claim 1, wherein said colored composition comprises 15% by weight to 30% by weight with respect to the total weight of the dry colored composition of at least one crosslinked polymeric compound (a).

4. The tire according to claim 1, wherein said colored composition comprises 30% by weight to 70% by weight with respect to the total weight of the dry colored composition of at least one thermoplastic polymeric compound (b).

5. The tire according to claim 1, wherein said colored composition comprises 4% by weight to 30% by weight with respect to the total weight of the dry colored composition of at least one coloring agent (c).

6. The tire according to claim 1, wherein said thermoplastic polymeric compound (b) has a glass transition temperature of 30° C. to 150° C.

7. The tire according to claim 6, wherein said thermoplastic polymeric compound (b) has a glass transition temperature of 45° C. to 100° C.

8. The tire according to claim 1, wherein said thermoplastic polyurethane ($a_1$) has a glass transition temperature ($T_g$) lower than or equal to −10° C.

9. The tire according to claim 8, wherein said thermoplastic polyurethane ($a_1$) has a glass transition temperature (Tg) of −15° C. to −60° C.

10. The tire according to claim 1, wherein said thermoplastic polyurethane ($a_1$) has a softening point of 25° C. to 150° C.

11. The tire according to claim 10, wherein said thermoplastic polyurethane ($a_1$) has a softening point of 30° C. to 100° C.

12. The tire according to claim 1, wherein said thermoplastic polyurethane ($a_1$) has a cold crystallization temperature of −20° C. to +10° C.

13. The tire according to claim 12, wherein said thermoplastic polyurethane ($a_1$) has a cold crystallization temperature of −10° C. to +0° C.

14. The tire according to claim 1, wherein said thermoplastic polyurethane ($a_1$) has a standard viscosity, measured at 20° C., of 500 mPa·s to 2000 mPa·s.

15. The tire according to claim 14, wherein said thermoplastic polyurethane ($a_1$) has a standard viscosity, measured at 20° C., of 1000 mPa·s to 1500 mPa·s.

16. The tire according to claim 1, wherein said thermoplastic polyurethane ($a_1$) is selected from hydroxyl terminated polyester polyurethanes.

17. The tire according to claim 1, wherein said polyisocyanate ($a_2$) is selected from aromatic polyisocyanates.

18. The tire according to claim 1, wherein said thermoplastic polymeric compound (b) comprises hydroxyl groups, said hydroxyl groups being present in an amount greater than or equal to 1% by weight with respect to the total weight of the thermoplastic polymeric compound (b).

19. The tire according to claim 18, wherein said hydroxyl groups are present in an amount of 1.5% by weight to 20% by weight with respect to the total weight of the thermoplastic polymeric compound (b).

20. The tire according to claim 1, wherein said thermoplastic polymeric compound (b) is selected from:
   ($b_1$) vinyl chloride copolymers;
   ($b_2$) hydrogenated polyketones;
   or mixtures thereof.

21. The tire according to claim 20, wherein said vinyl chloride copolymers ($b_1$) are selected from copolymers of vinyl chloride with at least one other vinyl comonomer.

22. The tire according to claim 21, wherein said vinyl comonomer is selected from: vinyl acetate, vinyl alcohol, 2-propenyl acetate, acrylic acid, acrylic acid esters, methyl methacrylate, 2-hydroxypropyl acrylate, glycidyl methacrylate, isobutyl vinyl ether, maleic acid, vinyl stearate, acrylamide, vinyl sulfonic acid, vinylidene chloride, or mixtures thereof.

23. The tire according to claim 20, wherein said vinyl chloride copolymers ($b_1$) are selected from vinyl chloride/acrylic acid ester copolymers, vinyl chloride/vinyl acetate copolymers, or mixtures thereof.

24. The tire according to claim 20, wherein said vinyl chloride copolymers ($b_1$) comprise carboxylic and/or epoxy functional groups.

25. The tire according to claim 20, wherein said vinyl chloride copolymers ($b_1$) comprise terpolymers of vinyl chloride, another vinyl compound or vinyl acetate, and an unsaturated carboxylic or polycarboxylic acid or ester.

26. The tire according to claim 25, wherein said terpolymers comprise vinyl chloride/vinyl acetate/maleic acid terpolymers; vinyl chloride/vinyl acetate/acrylic acid terpolymers, vinyl chloride/vinyl acetate/crotonic acid terpolymers or mixtures thereof.

27. The tire according to claim 20, wherein said hydrogenated polyketones ($b_2$) are selected from compounds having the following general formula (I):

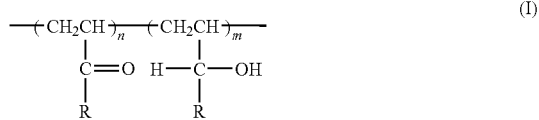

wherein:
R groups, which may be the same or different from each other, represent a linear or branched $C_1$-$C_{20}$ alkyl group; a $C_6$-$C_{18}$ aryl group; and
the n:m ratio is 0.1:1 to 1:1, or 0.3:1 to 0.5:1.

28. The tire according to claim 27, wherein said compounds having general formula (I) are: hydrogenated poly(vinyl methyl ketone), hydrogenated poly(vinyl butyl ketone), hydrogenated poly(vinyl phenyl ketone), hydrogenated poly(vinyl naphthyl ketone), or mixtures thereof.

29. The tire according to claim 28, wherein said compounds having general formula (I) are hydrogenated poly(vinyl phenyl ketones).

30. The tire according to claim 1, wherein said coloring agent (c) is selected from iron oxide, titanium dioxide, mica, calcium sodium borosilicate, powdered metals, powered aluminum or powdered copper, metal pastes, aluminum pastes, organic constituent containing pigments, inorganic constituent containing pigments, fluorescent constituent containing pigments, phosphorescent constituent containing pigments, luminescent constituent containing pigments, ultraviolet absorbing pigments, mineral constituent containing pigments, amorphous glass oxides, polyacrylates, metal flakes, reflective pigments, or mixtures thereof.

31. A method of applying a colored composition comprising:
(a) 5% by weight to 50% by weight with respect to the total weight of the dry colored composition of at least one crosslinked polymeric compound obtained by reacting (a1) at least one thermoplastic polyurethane with (a2) at least one polyisocyanate;
(b) 10% by weight to 80% by weight with respect to the total weight of the dry colored composition of at least one thermoplastic polymeric compound having a glass transition temperature higher than or equal to 20° C.; and
(c) 3% by weight to 50% by weight with respect to the total weight of the dry colored composition of at least one coloring agent;
onto the surface of an outer structural element of a vulcanized tire comprising the following steps:
(i) cleaning a portion of the surface to be coated with a solvent;
(ii) coating said surface with said colored composition; and
(iii) drying said colored composition to obtain a colored coating layer.

32. The method according to claim 31, wherein the solvent used in step (i) is selected from: ketones, acetone, methyl ethyl ketone, methyl isobutyl ketone; alcohols, methanol, ethanol, isopropanol, butanol; aliphatic or aromatic hydrocarbons, pentane, hexane, benzene, toluene; or mixture thereof.

33. The method according to claim 31, wherein step (ii) is carried out by painting, brushing, spraying, rolling, dipping, scraping, or pad printing.

34. The method according to claim 31, wherein step (iii) is carried out at ambient temperature for 24 hours to 72 hours.

35. The method according to claim 31, wherein step (iii) is carried out at a temperature of 50° C. to 120° C., for 10 minutes to 6 hours.

36. The method according to claim 31, comprising crosslinking polymeric compound (a) during step (iii).

* * * * *